United States Patent
Otero et al.

(10) Patent No.: US 11,565,963 B2
(45) Date of Patent: Jan. 31, 2023

(54) HOT-FORMING TOOL FOR PRODUCING GLASS CONTAINERS

(71) Applicant: SCHOTT Schweiz AG, St. Gallen (CH)

(72) Inventors: Marco Otero, St. Gallen (CH); Xaver Jud, Neukirch a. d.Thur (CH); Christian Garbini, Gossau (CH)

(73) Assignee: SCHOTT PHARMA SCHWEIZ AG, St. Gallen (CH)

( * ) Notice: Subject to any disclaimer, the term of this patent is extended or adjusted under 35 U.S.C. 154(b) by 66 days.

(21) Appl. No.: 16/739,376

(22) Filed: Jan. 10, 2020

(65) Prior Publication Data

US 2020/0148576 A1    May 14, 2020

Related U.S. Application Data

(63) Continuation of application No. PCT/EP2018/065968, filed on Jun. 15, 2018.

(51) Int. Cl.
*C03B 23/09* (2006.01)
*C03B 23/045* (2006.01)

(52) U.S. Cl.
CPC .......... *C03B 23/095* (2013.01); *C03B 23/045* (2013.01)

(58) Field of Classification Search
CPC .............. C03B 23/002; C03B 23/0046; C03B 23/0093; C03B 23/09; C03B 23/11; C03B 23/18
See application file for complete search history.

(56) References Cited

U.S. PATENT DOCUMENTS

| | | | |
|---|---|---|---|
| 3,424,570 A | 1/1969 | Couquelet | |
| 3,934,997 A * | 1/1976 | Inns | ........................ C03B 9/33 65/109 |
| 4,325,726 A | 4/1982 | Edwards | |
| 4,486,214 A | 12/1984 | Lynch | |
| 5,987,923 A | 11/1999 | Ostendarp | |

(Continued)

FOREIGN PATENT DOCUMENTS

| | | |
|---|---|---|
| CN | 1203201 | 12/1998 |
| CN | 1464865 | 12/2003 |

(Continued)

OTHER PUBLICATIONS

Takahashi et al., WO 2012169429, machine translation, Glass Forming Device, and Glass Forming Method, Dec. 2012. (Year: 2012).*

(Continued)

*Primary Examiner* — Queenie S Dehghan
(74) *Attorney, Agent, or Firm* — Ruggiero McAllister & McMahon LLC

(57) ABSTRACT

A hot-forming tool for producing glass containers is provided. The tool includes a forming roller, a holder, and a heat sink. The forming roller has a forming surface. The holder receives the forming roller with the forming roller rotatably mounted on the holder. The heat sink is directly or indirectly connected to the holder. The forming roller is in thermal contact with the heat sink and the heat sink has an internal cooler so that process heat can be transferred from the forming roller to the heat sink.

21 Claims, 3 Drawing Sheets

(56) References Cited

U.S. PATENT DOCUMENTS

| | | | | |
|---|---|---|---|---|
| 6,679,085 | B1 * | 1/2004 | Singer | C03B 13/16 65/162 |
| 2005/0072190 | A1 | 4/2005 | Nemugaki | |
| 2010/0313936 | A1 | 12/2010 | Nghiem | |
| 2015/0064779 | A1 | 3/2015 | Schultz | |
| 2019/0144326 | A1 * | 5/2019 | Glacki | C03B 23/095 65/24 |

FOREIGN PATENT DOCUMENTS

| | | | |
|---|---|---|---|
| CN | 201501826 | | 6/2010 |
| CN | 102992598 | | 3/2013 |
| CN | 202912838 | | 5/2013 |
| CN | 104418486 | | 3/2015 |
| CN | 106007342 | | 10/2016 |
| CN | 106145615 | | 11/2016 |
| CN | 106186647 | | 12/2016 |
| CN | 106630577 | | 5/2017 |
| DE | 2453923 | | 5/1976 |
| DE | 102015117212 | | 4/2017 |
| JP | 2009190367 | A * | 8/2009 |
| JP | 5475461 | | 4/2014 |
| KR | 20100031195 | | 3/2010 |

OTHER PUBLICATIONS

JP 2009190367 machine translation, Miyauchi N. et al., Thin Film Forming roll, Aug. 2009 (Year: 2009).*

International Search Report dated Oct. 29, 2018 for International Application No. PCT/EP2018/065968.

Written Opinion dated Oct. 29, 2018 for International Application No. PCT/EP2018/065968.

English translation of International Preliminary Report on Patentability dated Jan. 14, 2020 for International Application No. PCT/EP2018/065968, 5 pages.

* cited by examiner

HOT-FORMING TOOL FOR PRODUCING GLASS CONTAINERS

CROSS REFERENCE TO RELATED APPLICATIONS

This application is a continuation of International Application PCT/EP2018/065968 filed Jun. 15, 2018, which claims the benefit of German Application 10 2017 115 397.7 filed Jul. 10, 2017, the entire contents of all of which are incorporated herein by reference.

BACKGROUND

1. Field of the Invention

The invention relates to a hot-forming tool for producing glass containers which are used as pharmaceutical primary packaging means and also to a device for producing glass containers.

2. Description of Related Art

Hot-forming tools such as forming rollers and forming mandrels are used in processes for hot-forming glass into pharmaceutical primary packaging means, with forming mandrels forming the inner surface and forming rollers usually forming the outer surface of a glass container. While a blow-molding process is typically used for the production of conventional beverage bottles, as a general rule pharmaceutical primary packaging means are produced from glass tubes as a semi-finished product because of the greater demands in terms of optical inspection through the container wall. The production processes for beverage bottles and pharmaceutical primary packaging means are therefore quite different and constitute largely distinct technical fields.

The production of pharmaceutical primary packaging means such as syringes, carpules or vials customarily takes place in the prior art as described below. In order to convert the primary material, in this case glass tubing, into a defined shape, the glass tube is reshaped at multiple forming stations. The heating of the glass to the forming temperature is usually carried out in this case using gas burners at upstream heating stations. The hot glass tube is fed to the forming stations via rotating chucks, with the longitudinal axis of the glass tube corresponding to the axis of rotation. Within a forming system, the glass is shaped by means of forming rollers and a forming mandrel, with the forming roller located on the outside of the resulting container and the forming mandrel on the inside. For reshaping, the forming rollers perform a radial movement relative to the axis of rotation or longitudinal axis of the container or pipe section. The mandrel serves to guarantee the inner shape of the product. The rollers and the mandrel are lubricated between the forming strokes, firstly to reduce friction between the glass and the forming tools and thereby prevent surface defects. For this purpose, large quantities of oil are used in today's processes, which also have a cooling effect on the forming tools. In order to reduce the tool temperatures still further, air coolers are also used externally in order to prevent the glass from adhering to the tools.

The disadvantages of the prior art are that large amounts of forming oil are used for lubricating and cooling the forming tools. The oil burns away in part upon contact with the hot forming tools, as a result of which deposits accumulate on the forming tools which can lead to geometrical deviations in the containers, particle contamination and other deposits on the containers. These deposits on the tools have to be removed on a regular basis. The forming tools have be dismantled and cleaned for this purpose, resulting in a production interruption which allows the machine to cool down. Start-up losses are incurred until the forming tools are back at the correct temperature. Furthermore, the cooling of the forming tools by the forming oil is relatively uncontrolled, which means that constant temperatures of the forming tools and therefore constant preconditions for the hot-forming process cannot be reliably achieved.

Cooling of the forming tools by cooling air is also problematic because the forming oil is swirled and distributed by a strong flow of cooling air, which can lead to severe contamination of the entire forming machine and production environment. Equally, the strong air movement means that particles can reach the forming surfaces of the forming rollers, which then lead to rejects.

SUMMARY

The problem addressed by the present invention is that of improving the hot-forming process for the production of pharmaceutical primary packaging means so that rejects due to geometrical deviations and particle contamination are reduced and downtime of the forming machine due to cleaning processes or changing the hot-forming tools can be reduced, as well as providing a corresponding hot-forming tool. The invention also addresses the problem of increasing the service life of the hot-forming tools.

The hot-forming tool according to the invention for the production of glass containers comprises a forming roller with a forming surface, a holder for receiving the forming roller, and a heat sink directly or indirectly connected to the holder, the forming roller being rotatably mounted on the holder, wherein the forming roller is in thermal contact with the heat sink, and the heat sink has means for internal cooling, so that process heat can be transferred from the forming roller to the heat sink.

The hot-forming tool according to the invention is therefore characterized in that it comprises a rotating forming roller which can be cooled by a non-co-rotating heat sink, since the forming roller is in thermal contact with a heat sink which has internal cooling. The process heat absorbed by the forming roller via the glass being formed can therefore be delivered to the heat sink which is in thermal contact with the forming roller and which has internal cooling. External cooling of the forming roller by relatively large amounts of forming oil or cooling air can therefore be advantageously dispensed with. The amount of forming oil used can be reduced to a minimum quantity needed for a separating effect between the glass and forming roller. Using the forming tool according to the invention, cooling of the forming roller to temperatures of less than 300° C. and substantially below the flame temperature of the forming oil is possible.

The forming roller is preferably a cylindrically symmetrical plate which has the forming surface in the region of its lateral surface, said forming surface being designed for contact with the glass. The contour of the forming surface in this case typically corresponds to a portion of the outer contour of the glass container being produced. The forming roller is typically made of a high temperature-resistant material such as steel, at least in the region of the forming surface, and it may also be made sectionally of aluminum or an aluminum alloy.

The holder is used for the rotatable mounting of the forming roller. The holder preferably has a pivot bearing which can receive the forming roller and guarantees a smooth rotation. Likewise, however, the pivot bearing may also be an integral part of the form roller.

The heat sink may be a body of any kind which is in thermal contact with the forming roller but does not rotate with said forming roller. The heat sink is preferably made of a metal and, more preferably, of a metal having a particularly high thermal conductivity. Particularly preferably, the heat sink is made of aluminum, an aluminum alloy or a steel.

Thermal contact between the forming roller and the heat sink should be understood to mean that the forming roller and/or heat sink are configured in this manner by their shape or means are provided so that the best possible thermal contact exists. The heat transfer between the forming roller and the heat sink is, in particular, greater than the heat transfer between the forming roller and the holder.

In a preferred embodiment of the hot-forming tool, the connection between the forming roller and the holder is of detachable design, preferably as a screw connection. This means that a tool change can take place quickly and system downtimes can be reduced.

In a preferred embodiment of the hot-forming tool, the holder is integrally formed with the heat sink or a part of the heat sink. The holder and the heat sink may, in principle, be separate components according to their different functions. Preferably, however, the holder is integrally formed with the heat sink or a part of the heat sink and is only one component. The holder and heat sink can be made of aluminum or an aluminum alloy, for example.

In a further preferred embodiment of the hot-forming tool, the heat sink is arranged circumferentially around the holder, as a result of which maximum cooling of the forming roller can be achieved.

More preferably, the forming roller and the heat sink have mutually corresponding contact surfaces between which a gap is formed. This means that good thermal contact can be achieved. In this case, a corresponding contact surface should be understood to mean a surface portion of the forming roller or the heat sink in which the forming roller and heat sink are spaced apart by 1.0 mm or less. However, the forming roller and heat sink are not in mechanical contact but only in thermal contact in these regions.

Preferably, the gap between the forming roller and the heat sink can preferably be filled with a fluid, preferably with an oil. In order to prevent leakage of the oil, sealing elements may be provided. The oil improves the thermal contact between the forming roller and the heat sink. Likewise, the gap may be formed in such a manner that the oil is held in the gap only by adhesion forces. The gap is therefore formed or sealed in such a manner that the oil does not escape.

The distance between the forming roller and the heat sink in the region of the corresponding contact surfaces is preferably less than 0.5 mm, preferably less than 0.2 mm, and particularly preferably between 0.05 mm and 0.15 mm. Gap dimensions of this kind can be effectively achieved with conventional tolerances in metalworking and leave sufficient clearance for a different thermal expansion of the forming roller and heat sink on account of different temperatures or materials.

In a preferred embodiment of the hot-forming tool, the forming roller and heat sink are configured in such a manner that the corresponding contact surfaces of the forming roller and heat sink each have a surface area of at least $0.25\, \pi R^2$, preferably at least $\pi R^2$, and particularly preferably at least $1.5\, \pi R^2$, where R is the radius of the forming roller. The greater the corresponding contact area relative to the cross-sectional area of the forming roller, the more effective is the cooling of the forming roller. The corresponding contact area of the forming roller and heat sink is therefore even greater than the cross-sectional area of the forming roller, which can be achieved by depressions in the forming roller, for example, into which the heat sink extends.

In a preferred embodiment, the means for internal cooling of the heat sink comprise a transmission channel for a fluid coolant, preferably water or also water with additives such as a corrosion protection additive, for example.

In a preferred embodiment, the heat sink has an annular portion in its outer region through which the transmission channel extends. The position of the transmission channel in the outer region of the heat sink is relatively close to the forming surface of the forming roller, so that the cooling is particularly efficient here.

In a preferred embodiment of the hot-forming tool, the heat sink comprises an upper segment and a lower segment which are tightly connected to one another and between which a portion of the transmission channel runs. The two-part construction means that the heat sink with the transmission channel can be produced particularly simply.

In a preferred embodiment of the hot-forming tool, sealing elements are arranged between the upper segment and the lower segment of the heat sink which permanently guarantee the tightness between the upper segment and the lower segment.

In a preferred embodiment of the hot-forming tool, the forming roller is made of high temperature-resistant steel and/or the heat sink is made of aluminum, copper, an aluminum or copper alloy. Due to the low tool temperature, the forming roller and heat sink can both be made of aluminum or an aluminum alloy. By using aluminum, the weight of the forming roller can be kept particularly low, resulting in a low moment of inertia.

The invention further comprises a device for the production of glass containers. The device for the production of glass containers is characterized in that it comprises at least one hot-forming tool according to one of the preceding claims.

DETAILED DESCRIPTION

Figure 1:
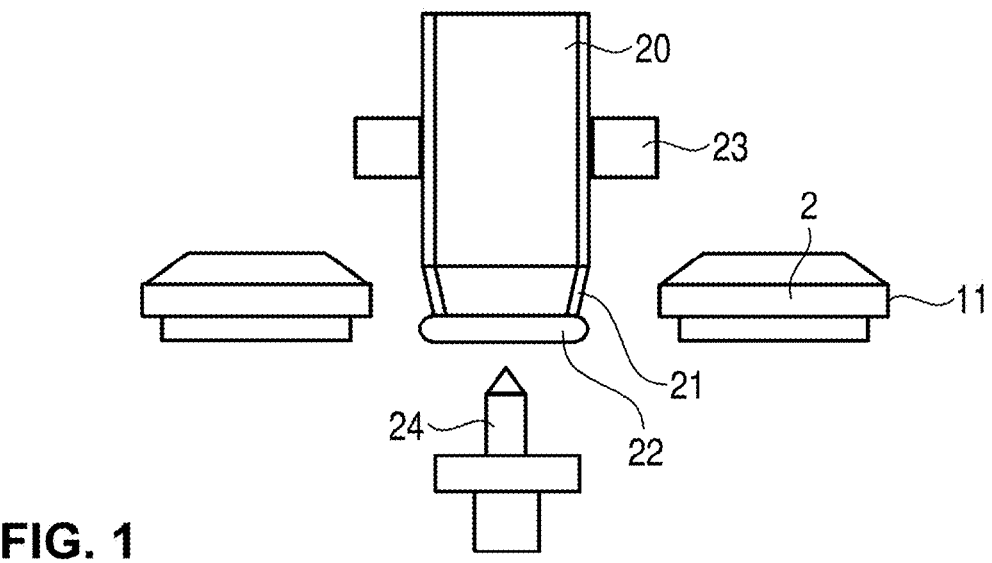
FIG. 1 is a schematic representation of the hot-forming of a pharmaceutical vial according to the prior art.

In FIG. 1, the hot-forming of a glass container, or a pipe section (20) from which the glass container is produced, is shown schematically according to the prior art. The pipe section is held by a holding chuck (23). The neck region (21) and mouth region (22) of the glass container are formed by the forming rollers (11) which have the forming surface on their outer lateral surface. The inner surface of the glass container in the mouth region is formed by a forming mandrel (24). According to the prior art, the forming rollers

(11) and forming mandrel (24) are provided with a forming oil before each forming cycle, for example by a dripping device (not shown).

Figure 2:
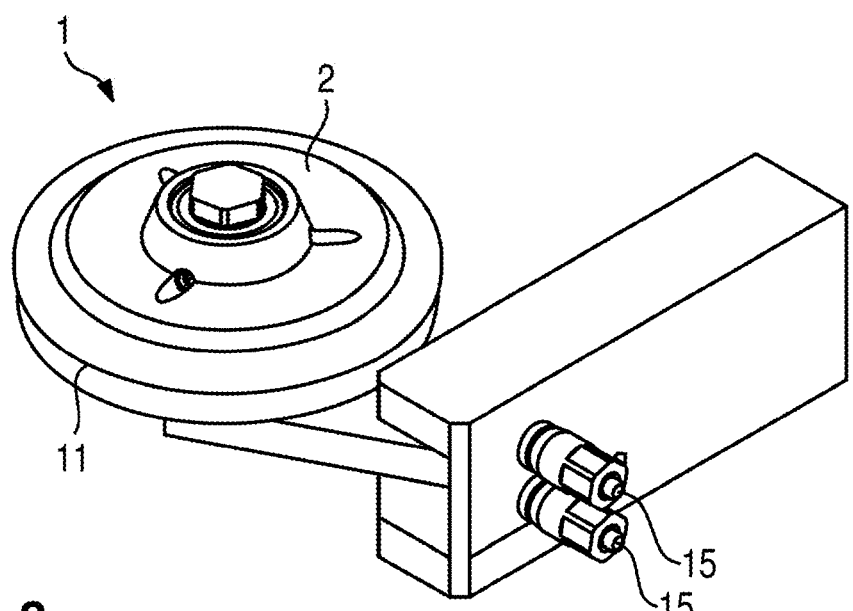
FIG. 2 is a perspective view of a hot-forming tool according to the invention.

FIG. 2 shows a perspective view of a hot-forming tool according to the invention. The forming roller (2) with the forming surface (11) sits on a holder (3) which at the same time represents a heat sink for said forming roller (2). The holder with the heat sink has coolant connections (15) for internal cooling.

Figure 3:
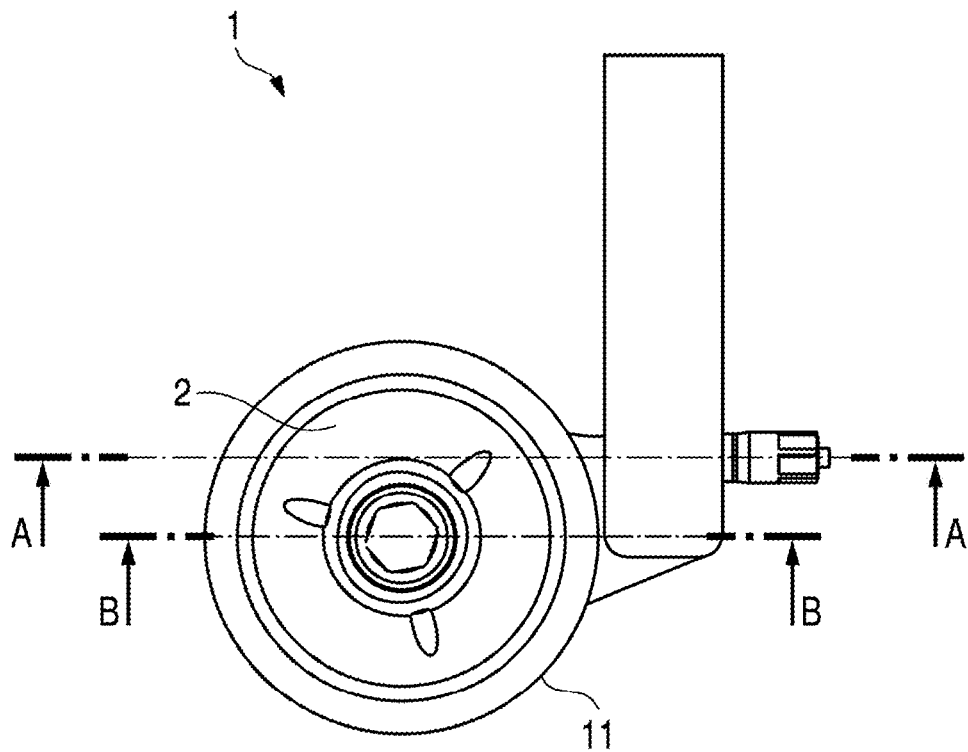
FIG. 3 is a plan view of a hot-forming tool according to the invention.

FIG. 3 shows a plan view of the hot-forming tool according to the invention in FIG. 2. Two vertical lines of intersection are shown; B-B through the center of the forming roller and A-A through the forming roller in the plane of the coolant connections.

Figure 4:
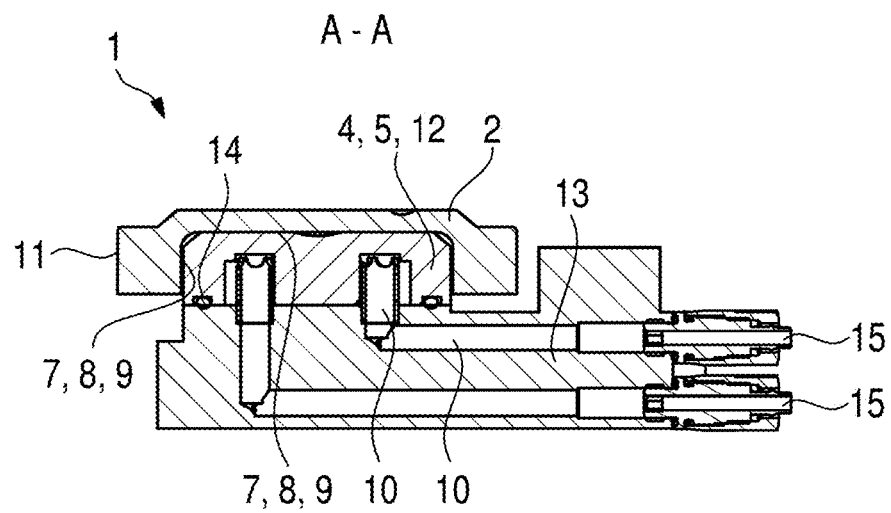
FIG. 4 is a cross-sectional view of the hot-forming tool of FIG. 3 taken along line A-A.

FIG. 4 shows the cross-sectional view through the hot-forming tool according to the invention in the line of intersection A-A in FIG. 3. The forming roller (2) with the forming surface (11) on its lateral surface has on its underside a recess into which the heat sink (4) extends. A gap (7) is formed between the heat sink (4) and forming roller (2), wherein the heat sink (4) and forming roller (2) form corresponding contact surfaces (8, 9) both on the lateral surface of the heat sink and on its upper side thereof. A transmission channel (10) for the transmission of coolant extends through the heat sink (4). The heat sink (4) comprises an upper segment (12) and a lower segment (13), wherein a portion of the transmission channel (10) runs between the two segments (12, 13). An O-ring (14) which prevents cooling liquid from escaping is arranged between the upper segment (12) and the lower segment (13). The transmission channel (10) is connected to coolant connections (15).

Figure 5:
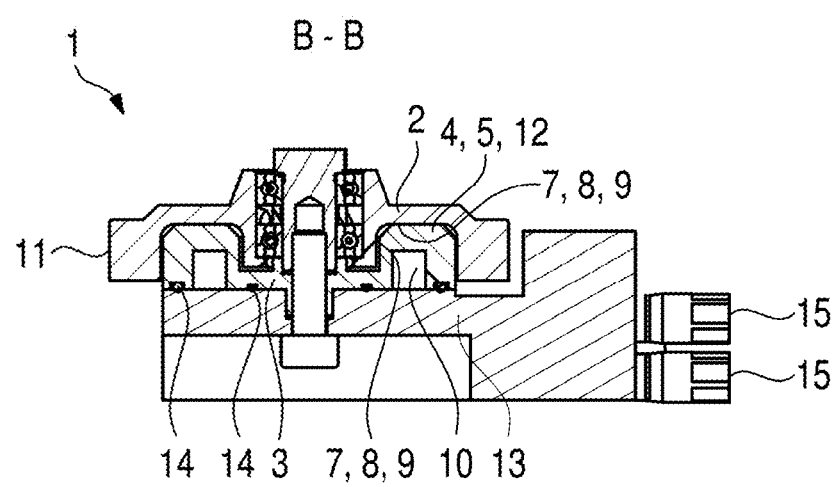
FIG. 5 is a cross-sectional view of the hot-forming tool of FIG. 3 taken along line B-B.

FIG. 5 shows the cross-sectional view through the hot-forming tool (1) according to the invention in the line of intersection B-B in FIG. 3. In this cross-sectional view through the axis of rotation of the forming roller, starting from FIG. 4 the rotatable holding of the forming roller (2) can moreover be identified on the holder (3) or the heat sink (4) by means of a screw connection and ball bearings. Furthermore, a second inner O-ring (14) can be identified between the upper segment (12) and the lower segment (13) of the heat sink (4).

The hot-forming tool according to the invention represents a departure from the hot-forming tools with externally cooled forming rollers used hitherto. The indirect cooling of the forming roller by means of a non-co-rotating heat sink makes it possible to completely dispense with external cooling of the forming roller in the traditional hot-forming process of glass containers for pharmaceutical packaging. The temperature of the forming roller can be constantly kept substantially below 300° C., which means that adhesion of glass to the forming roller and ignition of forming oil can be avoided. The hot-forming tool according to the invention is further characterized by a longer service life, since deposits of burnt oil residues can be substantially reduced and glass containers exhibit less particle contamination.

Due to its detachable connection to the holder, the forming roller can be exchanged very quickly and a replaced forming roller quickly returns to its normal operating temperature due to the low heat capacity. Downtime caused by replacing the hot-forming tools can thereby be reduced to a minimum. Furthermore, the hot-forming tool according to the invention has a very low weight, which is advantageous to the forming process.

LIST OF REFERENCE NUMBERS

1 Hot-forming tool
2 Forming roller
3 Holder
4 Heat sink
5 Annular portion of the heat sink
7 Gap
8 Corresponding contact surface on forming roller
9 Corresponding contact surface on heat sink
10 Transmission channel
11 Forming surface
12 Upper segment of the heat sink
13 Lower segment of the heat sink
14 O-ring
15 Coolant connections
20 Pipe section/pharmaceutical vials
21 Neck region
22 Mouth region
23 Holding chuck
24 Forming mandrel

What is claimed is:

1. A hot-forming tool for producing glass containers, comprising:
    a forming roller with a forming surface;
    a holder having the forming roller mounted on the holder for rotation with respect to the holder; and
    a heat sink arranged circumferentially around the holder and directly or indirectly connected to the holder,
    wherein the forming roller and the heat sink form corresponding thermal contact surfaces on two lateral surfaces of the heat sink and on an upper side of the heat sink, and
    wherein the heat sink has a cooling device so that process heat can be transferred from the forming roller to the heat sink.

2. The hot-forming tool of claim 1, wherein the forming roller and the holder are detachably connected to one another.

3. The hot-forming tool of claim 1, wherein the holder is integrally formed with or is part of the heat sink.

4. The hot-forming tool of claim 1, wherein the forming roller and the heat sink have mutually corresponding contact surfaces between which a gap is formed.

5. The hot-forming tool of claim 4, wherein the gap is filled with fluid oil.

6. The hot-forming tool of claim 4, wherein the gap has a distance of less than 0.5 mm.

7. The hot-forming tool of claim 6, wherein the distance is between 0.05 mm and 0.15 mm.

8. The hot-forming tool of claim 4, wherein the forming roller and heat sink are configured in such a manner that the corresponding contact surfaces have a surface area of at least $0.25\ \pi R^2$, where R is a radius of the forming roller.

9. The hot-forming tool of claim 1, wherein the cooling device comprises a transmission channel for a fluid coolant.

10. The hot-forming tool of claim 9, wherein the heat sink has an annular portion at an outer region through which the transmission channel extends.

11. The hot-forming tool of claim 9, wherein the heat sink comprises an upper segment and a lower segment that are tightly connected to one another and between which a portion of the transmission channel runs.

12. The hot-forming tool of claim 11, further comprising sealing elements are arranged between the upper segment and the lower segment.

13. The hot-forming tool of claim 1, wherein the heat sink comprises a material selected from a group consisting of aluminum, copper, an aluminum alloy, and a copper alloy.

14. A device for the production of glass containers comprising the hot-forming tool of claim 1.

15. A hot-forming tool for producing glass containers, comprising:
- a holder;
- a forming roller with a forming surface, the forming roller being rotatably mounted on the holder;
- a heat sink non-rotatably connected to the holder between the forming roller and the holder so that the forming roller is in thermal contact with the heat sink; and
- a cooling device cooling the heat sink,
- wherein the forming roller and heat sink are configured in such a manner that corresponding contact surfaces have a surface area of at least $0.25\,\pi R^2$, where R is a radius of the forming roller.

16. The hot-forming tool of claim 15, wherein the heat sink is arranged around an outer circumference of the holder to define a gap therebetween.

17. The hot-forming tool of claim 16, further comprising fluid oil in the gap.

18. The hot-forming tool of claim 15, wherein the cooling device comprises a transmission channel for a fluid coolant.

19. A hot-forming tool for producing glass containers, comprising:
- a forming roller with a forming surface;
- a holder, the forming roller being rotatably mounted on the holder;
- a heat sink directly or indirectly connected to the holder and in thermal contact with the forming roller; and
- a cooling device so that process heat can be transferred from the forming roller to the heat sink,
- wherein the heat sink comprises an upper segment and a lower segment having sealing elements arranged therebetween so as to define a portion of a coolant transmission channel through the heat sink.

20. A hot-forming tool for producing glass containers, comprising:
- a holder;
- a forming roller with a forming surface, the forming roller being rotatably mounted on the holder;
- a heat sink non-rotatably connected to the holder between the forming roller and the holder so that the forming roller is in thermal contact with the heat sink;
- a cooling device cooling the heat sink, wherein the heat sink is arranged around an outer circumference of the holder to define a gap therebetween; and
- fluid oil in the gap.

21. A hot-forming tool for producing glass containers, comprising:
- a holder;
- a heat sink;
- a forming roller with a forming surface;
- a bearing mounting the forming roller on the holder such that the forming roller is rotatable with respect to the holder and with respect to the heat sink and such that the forming roller is in thermal contact with the heat sink; and
- a cooling device in communication with the heat sink to thermally transfer process heat of the forming roller from the heat sink.

\* \* \* \* \*